United States Patent
Pellegrin, Jr.

(10) Patent No.: US 7,347,472 B2
(45) Date of Patent: Mar. 25, 2008

(54) SYSTEMS AND METHODS FOR USE IN MOBILE MEDICAL TRAINING

(75) Inventor: Hank F. Pellegrin, Jr., Bartlett, TN (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 0 days.

(21) Appl. No.: 10/394,625

(22) Filed: Mar. 21, 2003

(65) Prior Publication Data

US 2004/0201239 A1    Oct. 14, 2004

Related U.S. Application Data

(60) Provisional application No. 60/407,443, filed on Aug. 30, 2002.

(51) Int. Cl.
*A61G 10/00* (2006.01)
*A61G 3/00* (2006.01)

(52) U.S. Cl. .................... 296/24.38; 434/262
(58) Field of Classification Search ............... 296/24.3, 296/24.32, 24.38, 24.4, 24.41; 434/262–275
See application file for complete search history.

(56) References Cited

U.S. PATENT DOCUMENTS

| | | | |
|---|---|---|---|
| 4,181,347 A * | 1/1980 | Clark | 378/199 |
| 4,210,355 A | 7/1980 | Legueu | |
| 4,425,978 A | 1/1984 | Star | |
| 4,538,995 A * | 9/1985 | Fryer | 434/432 |
| 4,540,165 A * | 9/1985 | Green et al. | 5/618 |
| 4,672,296 A | 6/1987 | Griffin | |
| 4,712,822 A * | 12/1987 | Janos et al. | 296/24.38 |
| 4,785,227 A | 11/1988 | Griffin | |
| 4,850,268 A | 7/1989 | Saito et al. | |
| 4,915,435 A | 4/1990 | Levine | |

(Continued)

FOREIGN PATENT DOCUMENTS

| | | |
|---|---|---|
| CH | 339 699 A | 7/1959 |
| DE | 37 31 323 A1 | 12/1988 |
| DE | 39 02 396 A1 | 9/1989 |
| DE | 101 17 044 A1 | 12/2001 |
| EP | 0 547 536 A1 | 6/1993 |
| EP | 0 576 924 A1 | 1/1994 |

OTHER PUBLICATIONS

Sherman Hospital News Release, "Sherman Hospital to Host Unique Mobile Training Unit to Demonstrate Innovative New Cadiology Procedure", Oct. 27, 2003.*

(Continued)

*Primary Examiner*—Jason S Morrow
(74) *Attorney, Agent, or Firm*—Woodard, Emhardt, Moriarty, McNett & Henry LLP (57) ABSTRACT

An enclosure is provided that is adapted for mobile transport to a training site. In one embodiment, the enclosure includes a laboratory section equipped with medical equipment and instrumentation. In another embodiment, a supply of non-living anatomic material is provided for conducting one or more training activities in the laboratory section to provide training to medical personnel. A supply relationship may be established with an anatomic material supplier to satisfy training activity requirements. In yet another embodiment, the enclosure includes a conference section sized to accommodate a group of medical personnel and equipped with audio/visual equipment and/or other training aids. The conference section and the laboratory section may be linked by an electronic communication system. A satellite communication system may be included to provide visual communication between the training site and a remote site. The conference and laboratory sections may include one or more expandable side portions to selectively enlarge the enclosure.

31 Claims, 6 Drawing Sheets

U.S. PATENT DOCUMENTS

| | | | |
|---|---|---|---|
| 4,957,121 A | 9/1990 | Icenogle et al. | |
| 4,958,874 A | 9/1990 | Hegedus | |
| 5,173,052 A * | 12/1992 | Duncan, Jr. | 434/226 |
| 5,236,390 A * | 8/1993 | Young | 454/95 |
| 5,310,209 A | 5/1994 | Holman | |
| 5,398,986 A | 3/1995 | Koob | |
| 5,484,293 A | 1/1996 | Ford et al. | |
| 5,634,797 A * | 6/1997 | Montgomery | 434/268 |
| 5,667,267 A | 9/1997 | Talucci | |
| 5,706,616 A * | 1/1998 | Fernandez | 52/143 |
| 5,711,916 A | 1/1998 | Riggs et al. | |
| 5,727,353 A * | 3/1998 | Getz et al. | 52/79.1 |
| 5,755,478 A | 5/1998 | Kamiya et al. | |
| 5,755,479 A * | 5/1998 | Lavin et al. | 296/24.38 |
| 5,775,758 A * | 7/1998 | Eberspacher | 296/24.38 |
| 5,791,907 A * | 8/1998 | Ramshaw et al. | 434/262 |
| 5,801,755 A | 9/1998 | Echerer | |
| 5,964,065 A | 10/1999 | Migurski et al. | |
| 6,039,377 A * | 3/2000 | Eberspacher | 296/24.38 |
| 6,082,799 A | 7/2000 | Marek | |
| 6,179,358 B1 * | 1/2001 | Hirayama et al. | 296/24.38 |
| 6,209,939 B1 * | 4/2001 | Wacker | 296/24.3 |
| 6,299,229 B1 | 10/2001 | Becenas Nieto | |
| 6,302,475 B1 | 10/2001 | Anderson | |
| 6,369,847 B1 | 4/2002 | James et al. | |
| 6,601,894 B2 * | 8/2003 | Shaw | 296/24.3 |
| 6,775,518 B2 * | 8/2004 | Norcott et al. | 434/350 |
| 6,824,389 B1 * | 11/2004 | Garrett et al. | 434/262 |
| 6,929,061 B2 * | 8/2005 | Lajeunesse | 165/202 |
| 2002/0048743 A1 * | 4/2002 | Schmieding et al. | 434/262 |
| 2002/0061503 A1 * | 5/2002 | Chamberlain | 434/267 |
| 2003/0060808 A1 * | 3/2003 | Wilk | 606/1 |
| 2003/0134260 A1 * | 7/2003 | Hartman et al. | 434/350 |
| 2003/0186203 A1 * | 10/2003 | Aboud | 434/262 |
| 2004/0075555 A1 * | 4/2004 | Gantman | 340/541 |
| 2005/0227348 A1 * | 10/2005 | Sukumar | 435/287.1 |
| 2007/0132262 A1 * | 6/2007 | Chui Peng Sun et al. | 296/24.38 |

OTHER PUBLICATIONS

Sacred Heart Hospital News & Upcoming Events, "Mobile Cath Lab Provides On-Site Training in New Procedure to Cardiologists", Jun. 25, 2003.*

"Teacher's Guide to Distance Learning: Video Technologies", Florida Center for Instructional Technology, College of Education, University of South Florida, 1998, 1999. Web Address: http://fcit.coedu.usf.edu/distance/chap9.htm.*

One (1) page from website www.zimmer.com disclosing a Mobile Learning Center.

* cited by examiner

SYSTEMS AND METHODS FOR USE IN MOBILE MEDICAL TRAINING

CROSS REFERENCE TO RELATED APPLICATIONS

The present application claims the benefit of Provisional Application Ser. No. 60/407,443 filed on Aug. 30, 2002, the contents of which are hereby incorporated by reference in their entirety.

FIELD OF THE INVENTION

The present invention relates generally to the field of medical training, and more particularly relates to systems and methods for use in mobile medical training.

BACKGROUND

Medical personnel, such as surgeons and allied health professionals, typically require training relating to various surgical procedures, equipment and instrumentation. Such training may involve, for example, exhibitions, demonstrations, instruction, education and/or performance of hands-on training activities or exercises. Anatomical models, sometimes referred to as "sawbones" models, have been developed for use in the training of medical personnel. Cadavers have also been used to provide a somewhat greater level of realism and practicality to the training experience. In the past, training of medical personnel has been confined to fixed sites and locations such as hospitals, surgical centers, universities, or other non-mobile laboratories and/or training facilities.

Thus, there is a general need in the industry to provide improved systems and methods for use in association with the training of medical personnel. The present invention meets this need and provides other benefits and advantages in a novel and unobvious manner.

SUMMARY

The present invention relates generally to systems and methods for medical training. While the actual nature of the invention covered herein can only be determined with reference to the claims appended hereto, certain forms of the invention that are characteristic of the preferred embodiments disclosed herein are described briefly as follows.

In one form of the present invention, a mobile system for training medical personnel is comprised of an enclosure adapted for transport to a training site and including a laboratory section equipped with medical equipment and instrumentation, and a supply of non-living anatomic material for conducting one or more training activities in the laboratory section to provide training to the medical personnel.

In another form of the present invention, a method of training medical personnel is comprised of providing an enclosure including a laboratory section equipped with medical equipment and instrumentation, providing a supply of non-living anatomic material, transporting the enclosure to a training site, and conducting one or more training activities on the non-living anatomic material in the laboratory section of the enclosure to provide training to the medical personnel.

In yet another form of the present invention, a mobile system for training medical personnel is comprised of an enclosure adapted for transport to a training site and including a laboratory section and a conference section. The laboratory section is equipped with medical equipment and instrumentation for conducting one or more training activities to provide training to the medical personnel, and the conference section is sized to accommodate a group of the medical personnel.

In still another form of the present invention, a mobile system for training medical personnel is comprised of an enclosure adapted for transport to a training site and equipped with medical equipment and instrumentation, and an anatomic representation for conducting one or more training activities to provide training to medical personnel.

It is one object of the present invention to provide improved systems and methods for use in association with medical training.

Further objects, features, advantages, benefits, and further aspects of the present invention will become apparent from the drawings and description contained herein.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

Figure 1:
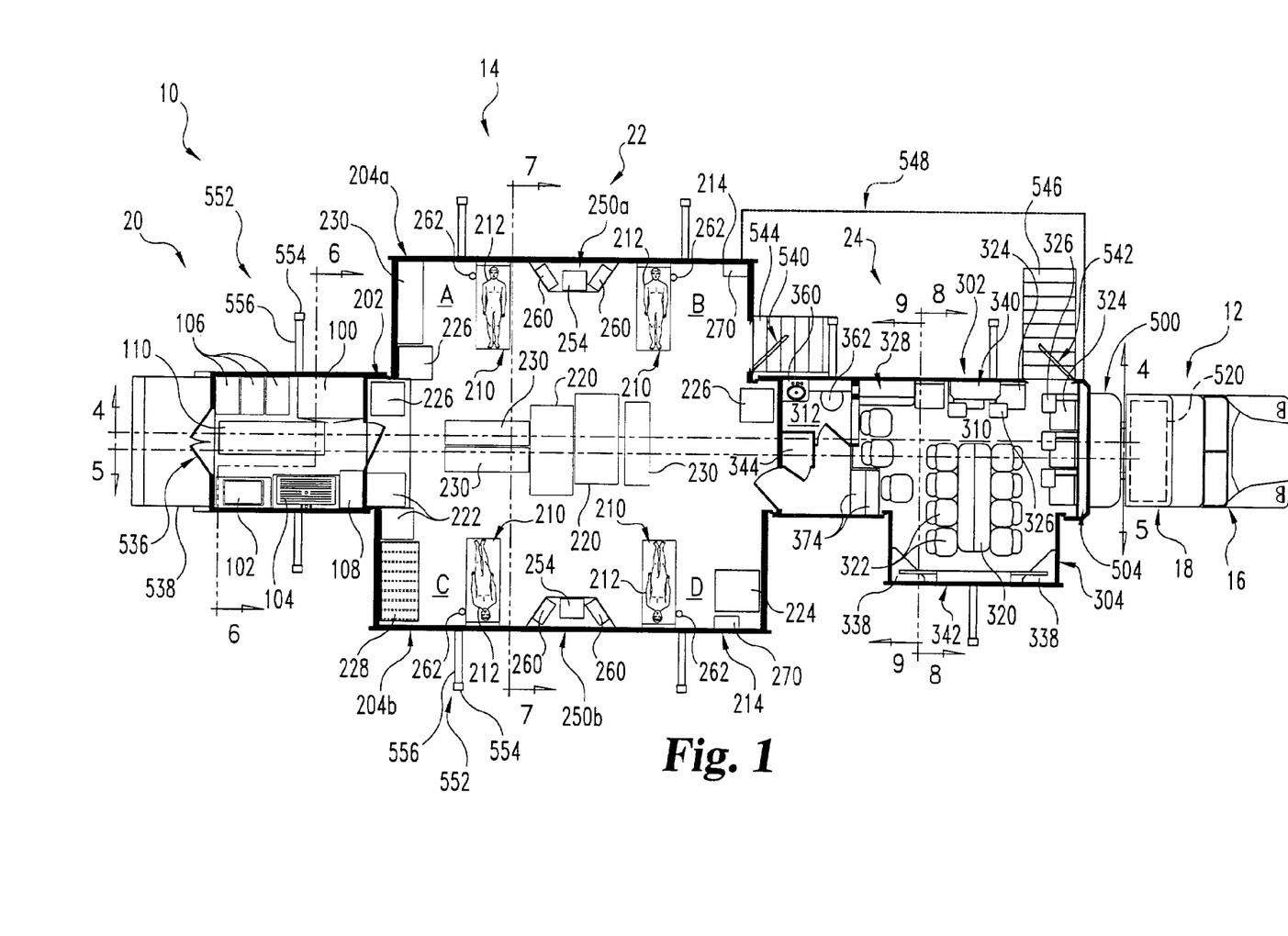
FIG. 1 is a top plan view of a mobile medical training system according to one form of the present invention, as shown in an expanded stationary configuration.
Figures 2, 3:
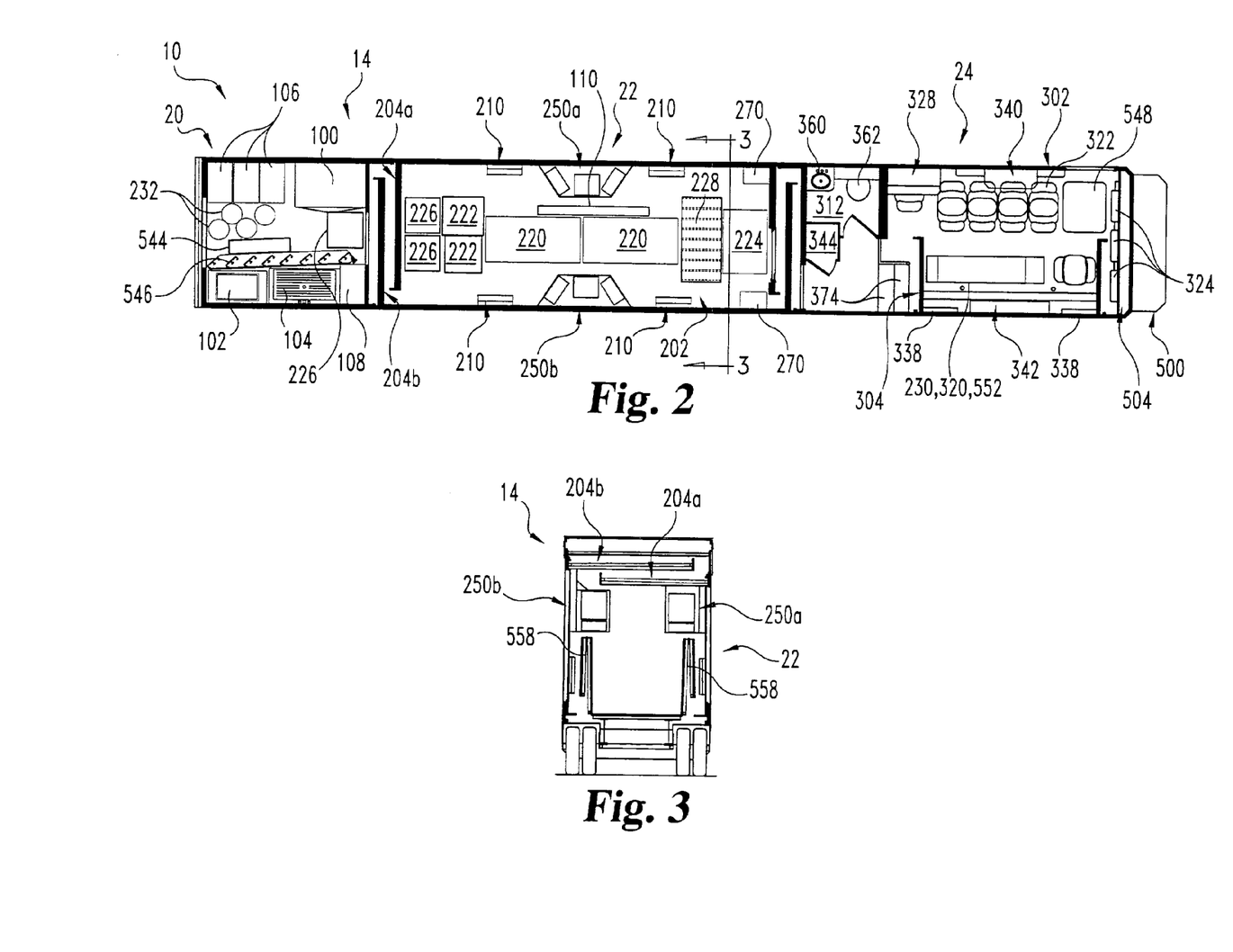
FIG. 2 is a top plan view of the mobile medical training system illustrated in FIG. 1, as shown in a stowed configuration for transport.
FIG. 3 is a partially cut-away end elevational view through the laboratory section of the mobile medical training system illustrated in FIG. 2, as shown in the stowed configuration, with the partial cut-away section viewed along line 3-3 of FIG. 2.
Figures 9, 10:
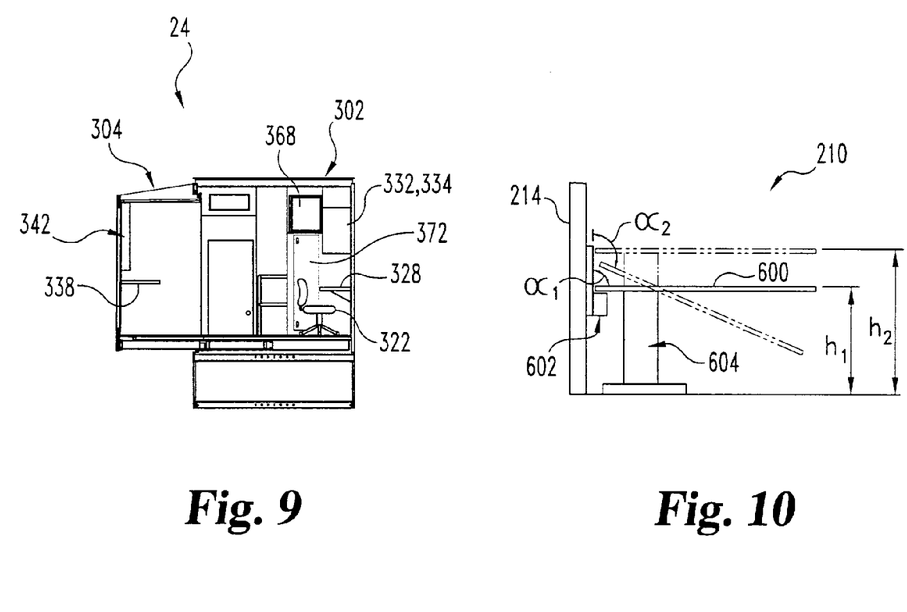
FIG. 9 is a partially cut-away end elevational view through the conference section of the mobile medical training system illustrated in FIG. 1, with the partial cut-away section viewed along line 9-9 of FIG. 1.
FIG. 10 is a side elevational view of an examination table according to one embodiment of the invention for use in association with the mobile medical training system illustrated in FIG. 1.
Figure 11:
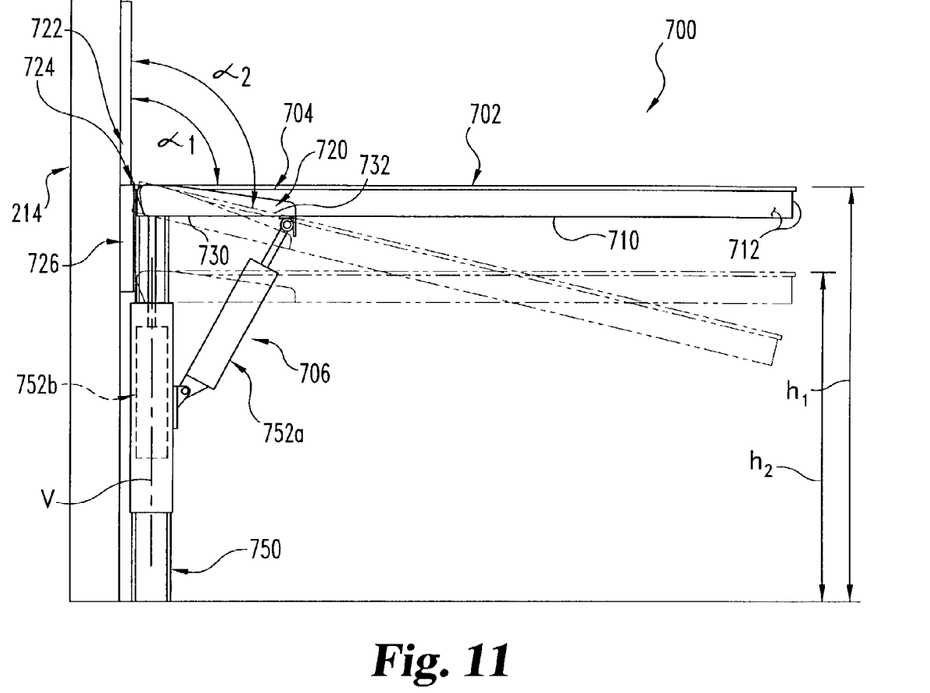
FIG. 11 is a side elevational view of an examination table according to another embodiment of the invention for use in association with the mobile medical training system illustrated in FIG. 1.
Figure 12:
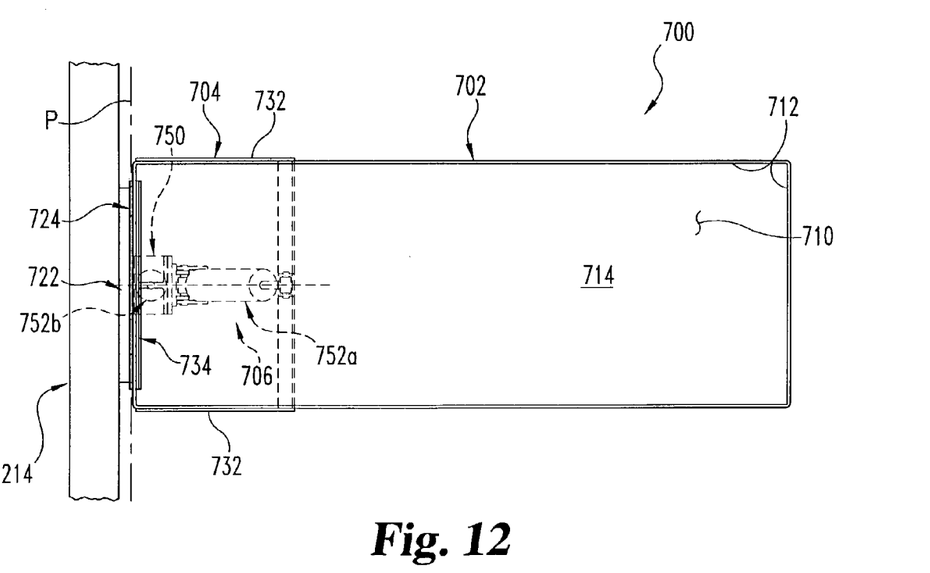
FIG. 12 is a top plan view of the examination table shown in FIG. 11.

Referring to FIGS. 1-10, shown therein is a mobile medical training system 10 according to one form of the present invention. FIGS. 1 and 4-9 show the mobile medical training system 10 in an expanded or stationary configuration. As will be discussed in further detail below, FIGS. 2 and 3 show the mobile medical training system 10 in a stowed or transport configuration. FIG. 10 shows an examination table according to one embodiment of the invention for use in association with the mobile medical training system 10. FIGS. 11 and 12 show an examination table according to another embodiment of the invention for use in association with the mobile medical training system 10.

The mobile medical training system 10 is generally comprised of a powered portion 12 adapted for highway transport and an enclosure portion 14 adapted to be transported by the powered portion 12 to a training site. For purposes of the present invention, the term "highway" includes various types of roads, roadways, freeways, thoroughfares, interstate systems, streets or any other structure enabling transport of the mobile medical training system 10 across a distance. It should also be understood that other modes of transportation are also contemplated as falling within the scope of the present invention, including, for example, railways, waterways or air travel.

In one embodiment of the invention, the powered portion 12 is configured as a semi-truck or a tractor-type vehicle capable of being driven on a highway system. In one embodiment, the semi-truck 12 includes a driver cab 16 and a sleeper cab 18. It should be understood, however, that other types of powered vehicles are also contemplated for use in association with the present invention, including various types of trucks or automobiles. In the illustrated embodiment of the invention, the enclosure portion 14 is configured as a semi-type tractor trailer capable of being towed or otherwise transported by the semi-truck 12. It should be understood, however, that other types of enclosures are also contemplated for use in association with the present invention, including various configurations of trailers or other enclosed structures. It should also be understood that although the powered portion 12 and the enclosure portion 14 are illustrated as separate units that are detachably coupled together, in other embodiments of the invention the powered portion 12 and the enclosure portion 14 may be integrally formed to define a unitary structure, such as, for example, as might be found in a van, a bus, a motor coach, or a recreational-type vehicle.

In one embodiment of the invention, the enclosure portion 14 of the mobile training system 10 is generally comprised of a storage/preparation section 20, a laboratory section 22, and a conference section 24. The storage/prep section 20 is primarily used to store and/or to prepare anatomic material and medical devices, including various types of equipment and instrumentation for use in the laboratory section 22. The laboratory section 22 is primarily used to train medical personnel via conducting one or more training activities and exercises on the anatomic material using various types of medical devices, equipment, and instrumentation. The conference section 24 is primarily used to train medical personnel via presentations, lecturing, audio/visual displays and/or electronic viewing of examination activities and procedures taking place in the laboratory section 22 and/or at other remote sites. It should be understood, however, that the various sections 20, 22 and 24 of the mobile training system 10 are not limited to the specific activities and uses described above, but may also be used for other activities and uses associated with the training of medical personnel.

The storage/prep section 20 includes devices and equipment used in the storage and preparation of anatomic material and various medical devices and instrumentation that are used in the laboratory section 22. A refrigerated cooler 100 is included to store an amount of the anatomic material for subsequent use in the laboratory section 22. For purposes of the present invention, the term "anatomic material" includes human cadavers, human cadaver parts, or any non-living animal tissue. In one embodiment, the cooler 100 is a free-standing unit that is mounted on wheels or casters to allow the cooler 100 to be readily moved from one location to another. It should be understood, however, that the cooler 100 may alternatively be integrated into the enclosure 14 so as to form a built-in refrigerated compartment.

The storage/prep section 20 is also equipped with an ultrasonic cleaner or washer 102 to clean/sanitize instruments, equipment, and devices that are used in the laboratory section 22. The storage/prep section 20 additionally includes a utility sink 104 to aid in the preparation and cleaning of the instrumentation, equipment, devices and anatomic material used in the laboratory section 22. The storage/prep section also includes a number of bins or tubs 106 and cabinets or shelves 108 to provide sufficient storage space. A stretcher 110 may be provided to aid in transporting a supply of anatomic material into the storage/prep section 20 and/or to convey the anatomic material between the storage/prep section 20 and the laboratory section 22. It should be understood, however, that the contents of the storage/preparatory section 20 are not limited to the devices and equipment specifically discussed above, but may include other devices and equipment that are used to store and/or prepare materials and devices for use in the laboratory section 22.

The laboratory section 22 is equipped with medical equipment and instrumentation for use in association with the training of medical personnel via the performance of one or more training activities, exercises or procedures on the anatomic material. For purposes of the present invention, the term "medical personnel" includes one or more surgeons, physicians, nurses, medical technicians, allied health professionals, or other persons requiring medical training.

In one embodiment of the invention, the laboratory section 22 includes a central portion 202 and a pair of extendable side portions 204a, 204b. The extendable side portions 204a, 204b are configured to telescopically expand in a lateral direction relative to the central portion 202 to selectively enlarge the overall footprint of the laboratory section 22 (FIG. 1). The extendable side portions 204a, 204b are also configured to telescopically retract into the central portion 202 when not in use to permit highway transport (FIGS. 2 and 3). It should be understood, however, that in other embodiments of the invention, the laboratory section 22 may include a single extendable side portion or may be limited to a non-extendable central portion 202. The extendable side portions 204a, 204b can be expanded/retracted by a hydraulic drive, an electric drive, or by manual means. Additional features and details regarding expandable enclosures are relatively well known and therefore need not be specifically discussed herein.

The laboratory section 22 includes a number of examination or training stations configured to accommodate one or more groups of medical personnel and/or to permit concurrent performance of multiple training activities, exercises or procedures. In one embodiment of the invention, the laboratory section 22 includes four training stations A, B, C and D, with a first pair of the training stations A and B located in the extendable side portion 204a and a second pair of the training stations C and D located in the extendable side portion 204b. However, it should be understood that the laboratory section 22 may include any number of training stations, including a single training station, and that other arrangements and configurations of the training stations are also contemplated as falling within the scope of the present invention.

As will be discussed in greater detail below, the training stations A-D each include various instruments, devices and equipment that provide the laboratory section 22 with an environment similar to that of an operating room. In one embodiment of the invention, each of the training stations A-D includes an examination table 210 adapted to support anatomic material, such as a human cadaver 212, for examination by the medical personnel. Each of the training stations A-D is also provided with equipment and utilities normally found in an operating room environment, such as, for example, a swing arm light, a suction/vacuum source, a compressed air/nitrogen source, and one or more electrical outlets.

In one embodiment of the invention, the examination tables 210 are pivotally coupled to a wall 214 of the enclosure 14 to allow the tables 210 to be selectively pivoted between an examination position (FIG. 1) and a stowed position (FIG. 2). When in the examination position, the examination tables 210 are arranged in a substantially horizontal orientation. When in the stowed position, at least the base or anchoring portions of the examination tables 210 are preferably arranged in a substantially vertical orientation, thereby significantly reducing the footprint area required to store the examination tables 210 during transport of the mobile training system 10. In another embodiment of the invention, at least the table top or pan portion of the examination tables 210 are releasably coupled to the wall 214 of the enclosure 14 to allow for selective removal for transport, storage, cleaning and/or other maintenance procedures. In yet another embodiment of the invention, each of the examination tables 210 includes an adjustment mechanism adapted to provide selective adjustment of the vertical position and/or angular orientation of the examination tables 210. In still another embodiment of the invention, the examination tables 210 are formed of a radioluscent material. Additional aspects and features of the examination tables 210 will be discussed in further detail below.

The laboratory section 22 is equipped with various types of medical equipment and instrumentation to aid in the training of the medical personnel. For example, a number of radiographic machines 220 are included to provide x-ray or fluoroscopic viewing of the anatomic material and/or the placement of instruments and devices within the anatomic material. In one embodiment of the invention, the x-ray machines are of the C-arm type and are equipped with a remote view box. However, other types and configurations of x-ray or fluoroscopic viewing machines are also contemplated for use in association with the present invention. One or more treon or ion machines 222 may be included to provide two-dimensional and/or three-dimensional visualization capabilities for use in association with image guidance or surgical navigation procedures. A microscope 224 may also be included for microscopic examination of the anatomic material. Additionally, a number of cabinets 226, lockers 228, and tables 230 are provided to store and support various types of medical equipment, instrumentation and devices that are used during the training activities and exercises. The cabinets, lockers, tables and other large equipment and instrumentation are preferably mounted on wheels or casters to allow for quick and efficient movement from one location to another, particularly during the expansion/retraction of the laboratory section 22. A number or containers 232 are included to accommodate the disposal of anatomic material, bio-waste, or other types of waste.

A variety of medical and surgical equipment, instruments and devices are provided in the laboratory section 22 to aid in the training of the medical personnel. Such instruments and devices include, by way of example, fluoroscopes, endoscopes, microscopes, image guidance systems, suction systems, air supply systems, powered surgical instruments, general surgical instruments such as scalpels, knives, scissors, curettes, ronguers, drills, saws, trephines, dissectors, mallets, clamps, forceps, retractors, spreaders, rulers, needles, and an assortment of surgical implants and prostheses.

The laboratory section 22 is also equipped with various types of electronic equipment to further aid in the training of medical personnel. In one embodiment of the invention, each of the expandable side portions 204a, 204b of the laboratory section 22 includes a central electronic visualization station 250a, 250b, respectively. Each of the visualization stations 250a, 250b includes a central compartment 252 that contains visualization/video equipment 254 and/or other types of electronic equipment such as a printer or a video cassette recorder. Each of the visualization stations 250a, 250b also includes a pair of side compartments 256, 258 arranged on either side of the central compartment 252 which are sized to house a viewing monitor 260. Each of the side compartments 256, 258 are preferably arranged at an angle facing a respective training station A-D to provide an optimal viewing angle of the monitors 260 by the medical personnel.

One or more of the training stations A-D is preferably equipped with a video camera 262 mounted above the examination table 210. The video camera 262 may be mounted to the wall 214 via a swing arm to allow for variable positioning of the video camera 262 relative to the examination table 210. The video camera 262 is electronically coupled to a respective viewing monitor 260 to provide an unrestricted view of the cadaveric material 212 to the medical personnel during the training activities and exercises. As will be discussed below, the video cameras 262 may also be electronically coupled to a video projector or display located in the conference section 24 to provide remote viewing of the cadaveric material 212 by the medical personnel during the training activities and exercises. The viewing monitors 260 may also be electronically coupled to other types of visualization equipment, such as fluoroscopic equipment, endoscopic equipment, or image guidance or surgical navigation systems to provide internal visualization of the cadaveric material 212 by the medical personnel.

A number of stretchers (not shown) may also be included to aid in conveying anatomic material between the storage/prep section 20 and the laboratory section 22. The stretchers are preferably of the collapsible type to allow for compact storage when not in use. Various types of equipment and devices may be positioned below each of the visualization stations 250a, 250b, such as, for example, an electronic touch screen 264, a Sharps container 266 and a wall heater 270. Additionally, an exhaust vent 270 is preferably included within each of the expandable side portions 204a, 204b to provide proper venting of the laboratory section 22. It should be understood that the contents of the laboratory section 22 are not limited to the above-listed equipment, instruments and devices, but may include other equipment, instruments and devices that are commonly found in an operating room environment, in a medical or research laboratory, or in a medical training facility.

The conference section 24 is primarily used to train a group of medical personnel via presentations, lecturing, audio/visual displays and/or remote electronic viewing of the examination activities and procedures taking place in the laboratory section 22. In one embodiment of the invention, the conference section 24 includes a central portion 302 and an extendable side portion 304. The side portion 304 is configured to telescopically expand in a lateral direction relative to the central portion 302 to selectively enlarge the overall footprint of the conference section 24 (FIG. 1). The extendable side portion 304 is also configured to telescopically retract into the central portion 302 when not in use to permit highway transport (FIGS. 2 and 3). It should be understood, however, that in other embodiments of the invention, the conference section 24 may include two or more extendable side portions to further increase the footprint area of the conference section 24, or may be limited to a non-extendable central portion 302. The extendable side portion 304 can be hydraulically driven, electrically driven, or manually driven.

The conference section 24 includes a main conference room area 310 and a lavatory area 312. The main conference room area 310 is sized to comfortably accommodate a group of medical personnel for various training activities, exercises and procedures. In one embodiment of the invention, the main conference room 310 includes a conference table 320, a number of chairs 322 dispersed about the conference table 320, and a number of fold-up seats 324 equipped with desk/table tops 326 dispersed about the outer perimeter of the conference section 310. In the illustrated embodiment, the conference room 310 is capable of accommodating sixteen persons. However, it should be understood that the conference room 310 may be configured to accommodate larger groups or smaller groups of medical personnel.

A control desk 328 is positioned adjacent the outer perimeter of the conference room 310 which can be used, for example, to accommodate a computer and computer monitor 330, a cell phone (not shown), a coffee maker 332, or other types of equipment and devices normally associated with a conference room environment. The control desk 328 is also preferably provided with an overhead storage cabinet 334, electrical outlets, and lighting. An open storage area or compartment 336 may be provided adjacent the storage cabinet 334. Shelving 338 may also be provided about the outer perimeter of the conference room 310 to provide additional storage space. The shelving 338 may be configured to pivot or flip up into a vertical position for compact storage during transport of the mobile training system 10.

The conference section 24 is equipped with audio/visual equipment and other components to facilitate training of medical personnel. In one embodiment of the invention, a video projector unit 340 is mounted to a side wall of the conference room 310 with a video screen 342 mounted to an opposite side wall of the conference room 310. Although the video projector unit 340 has been illustrated and described as a front projection unit, it should be understood that other types of video equipment may be provided, including a rear projection unit, one or more viewing monitors, an LCD screen, or other types and configurations of video displays. A slide projector or other types of projectors may be provided for viewing slides or other types of film media on the video screen 342.

Various types of audio/visual electronic components and devices may be electronically coupled to the video projector unit 340, including, for example, a digital video player or recorder, a video cassette player or recorder, an audio receiver, a satellite receiver, or other types of audio/visual equipment. Additionally, the video projector unit 340 may be electronically coupled to one or more of the video cameras 262 mounted above the examination tables 210 in the laboratory section 22 to provide a communication link between the laboratory section 22 and the conference section 24. Such communication link would provide for remote viewing of the training exercises and activities conducted in the laboratory section 22 within the confines of the conference section 24. The laboratory section 22 and the conference section 24 may also be provided with audio equipment to provide one-way or two-way communication therebetween. The audio/visual electronic components and devices that are used in association with the video projector unit 340 are preferably centrally housed in a control closet or cabinet 344 equipped with a component rack. In addition to electronic audio/visual equipment, the conference section 24 may also be equipped with other types of training aids, including, for example, an x-ray viewer, a marker board, a paper board, a chalk board, or other type of training aids that would facilitate training of medical personnel.

The lavatory area 312 includes a hand sink 360, a toilet 362, a mirror 364 and an overhead storage cabinet 366. A compact refrigerator 368 may also be mounted atop or near the lavatory area 312. The closet 344 is positioned adjacent the lavatory area 312 and provides ample storage space for the audio/visual equipment, satellite equipment, or other types of equipment or devices. Additionally, an attic storage area 370 is provided above the lavatory area 312. A centralized electrical load center 372 is also disposed adjacent the lavatory area 312 which is easily accessible from the conference room area 310. The centralized load center 372 may include, for example, a power panel containing circuit breakers, fuses, meters, phase sequence indicators, switches, and other related power distribution and electrical control devices. Since the conference room area 310 is located within an elevated or overhanging portion of the enclosure 14, one or more steps 374 are provided between the lavatory area 312 and the conference room area 310.

Figure 4:
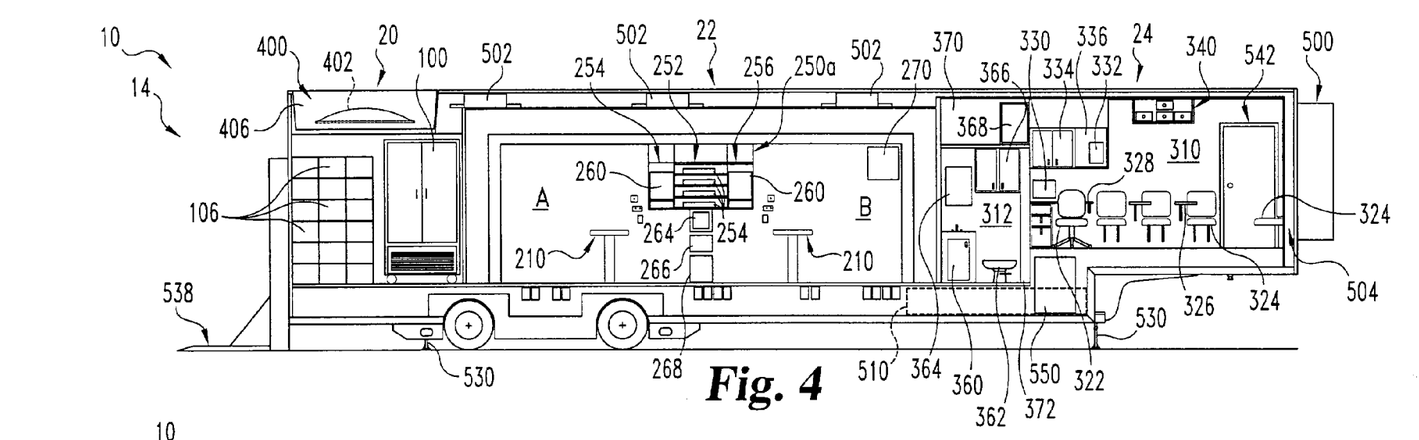
FIG. 4 is a partially cut-away side elevational view of the mobile medical training system illustrated in FIG. 1, with the partial cut-away section viewed along line 4-4 of FIG. 1.
Figure 5:
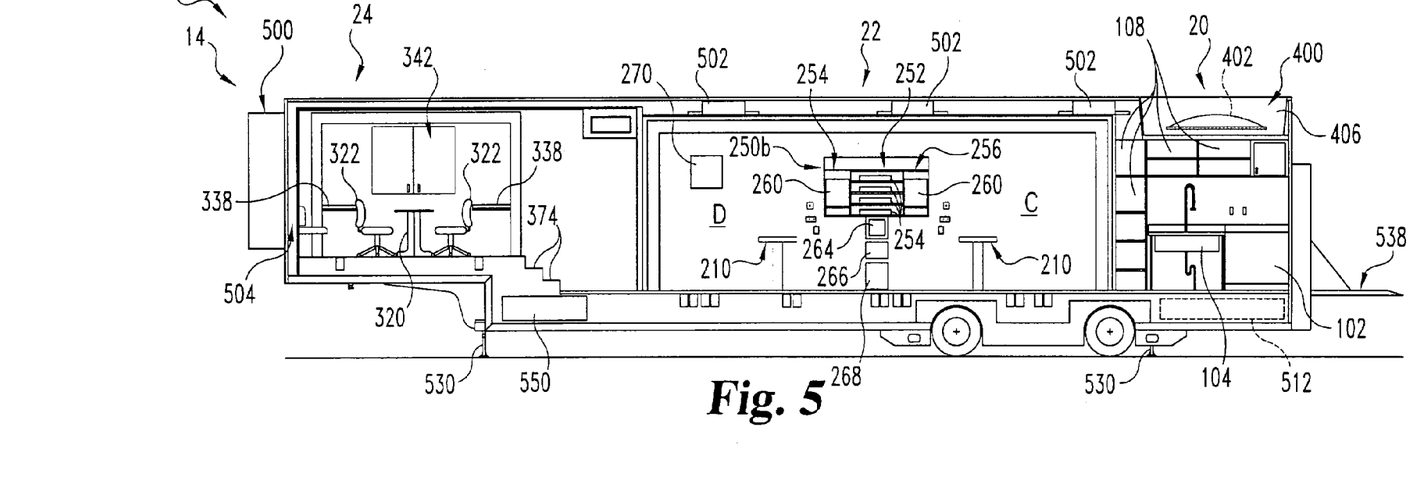
FIG. 5 is a partially cut-away side elevational view of the mobile medical training system illustrated in FIG. 1, with the partial cut-away section viewed along line 5-5 of FIG. 1.
Figure 6:
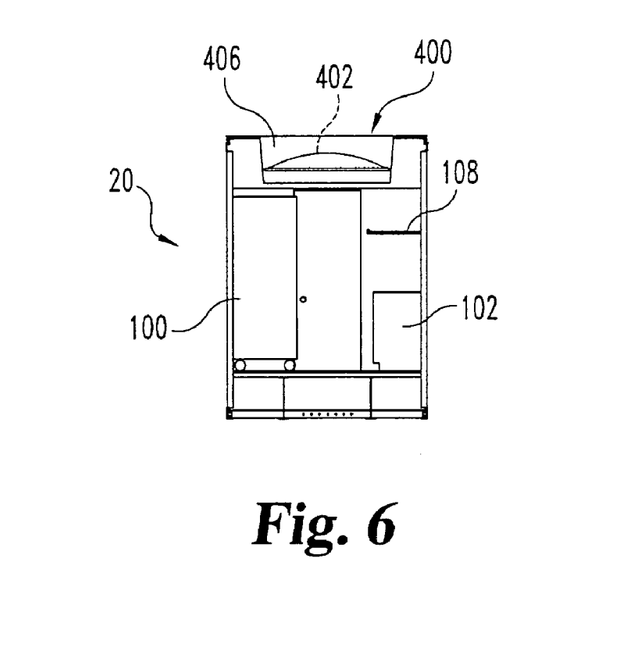
FIG. 6 is a partially cut-away end elevational view through the storage/preparation section of the mobile medical training system illustrated in FIG. 1, with the partial cut-away section viewed along line 6-6 of FIG. 1.
Figure 7:
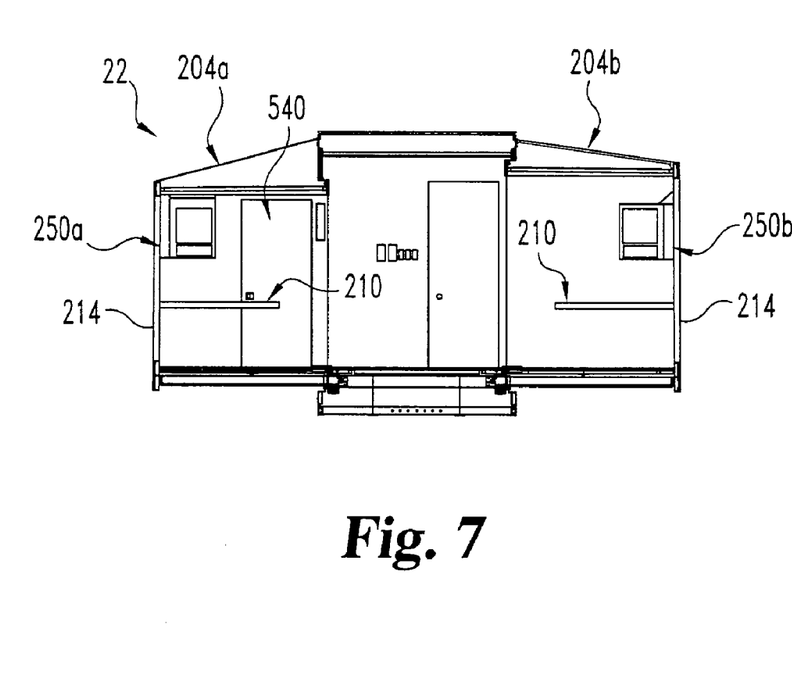
FIG. 7 is a partially cut-away end elevational view through the laboratory section of the mobile medical training system illustrated in FIG. 1, with the partial cut-away section viewed along line 7-7 of FIG. 1.
Figure 8:
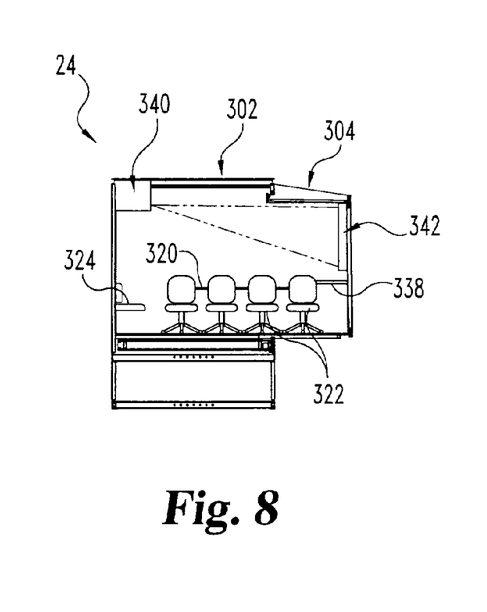
FIG. 8 is a partially cut-away end elevational view through the conference section of the mobile medical training system illustrated in FIG. 1, with the partial cut-away section viewed along line 8-8 of FIG. 1.

As shown in FIGS. 4-6, the mobile medical training system 10 is equipped with a communication system 400 adapted to provide at least a visual communication link, and preferably an audio/visual communication link, between the training site and a remote site. In one embodiment of the invention, the communication system 400 is a satellite communication that generally includes a satellite dish 402, a satellite receiver (not shown), and other devices and components normally associated with satellite communication systems. The satellite dish 402 is preferably positioned within a recessed area or pool 406 located above the storage/prep section 20 during transport of the mobile training system 10. Although the communication system 400 has been illustrated and described as a satellite communication system, it should be understood that other communication systems are also contemplated for use in providing at least visual communication with a remote location, including, for example, teleconferencing systems, internet communication systems, microwave communication systems, or any other communication system capable of providing at least visual communication between the training site and a remote site. It should also be understood that the communication system 400 can be configured to provide either one-way or two-way communication between the training site and the remote site.

As discussed above, the satellite communication system 400 provides visual communication between the mobile training system 10 and a remote site, such as, for example, a hospital, a surgical center, a university, a laboratory, a research facility, or other types of training facilities. In a specific embodiment of the invention, the satellite communication system 400 provides visual communication between the mobile training system 10 and a live operating room. The satellite communication system 400 may be used, for example, to allow the medical personnel within the mobile training system 10 to view live surgeries, presentation, lectures, or other training activities or exercises conducted at sites or locations remote from the mobile training system 10.

In one embodiment of the invention, the satellite communication system 400 is electronically coupled to one or more of the video monitors 260 located in the laboratory section 22 to provide a communication link between the laboratory section 22 and the remote site. In another embodiment of the invention, the satellite communication system 400 is electronically coupled to the video projector unit 340 located in the conference section 24 to provide a communication link between the conference section 22 and the remote site. In another embodiment of the invention, the satellite communication system 400 may be electronically coupled to one or more of the video monitors 260, the video projector unit 340, or any other video display to provide a visual communication link between the remote site and the laboratory section 22, the conference section 24, or any other section or area of the mobile training system 10.

In addition to the above-discussed systems and features, the mobile training system 10 includes other systems and features that support the operation and functioning of the storage/prep section 20, the laboratory section 22 and the conference section 24. For example, the mobile training system 10 includes an HVAC unit 500 that heats, cools and ventilates the enclosure 14 to provide a comfortable training environment. The HVAC system also includes a number of chiller units 502 and a number of evaporators (not shown) located atop the enclosure 14. In one embodiment of the invention, the HVAC unit 500 is configured to provide a constant supply of fresh air to the enclosure 14 via an air duct system 504 that runs along virtually the entire length of the enclosure 14. In another embodiment of the invention, the HVAC unit 500 is configured to provide a complete air change to the enclosure 14 approximately every fifteen minutes.

The mobile training system 10 is also equipped with an on-board water supply tank 510 (FIG. 4) mounted to the underbody of the enclosure 14 to provide fresh water to the washer 102 and the utility sink 104 in the storage/prep section 20, the hand sink 360 and toilet 362 in the lavatory area 312, and any other piece of equipment or instrumentation that requires a fresh water supply. At least one on-board waste water tank 512 (FIG. 5) is also mounted to the underbody of the enclosure 14 to provide a reservoir for capturing and storing waste water for subsequent disposal.

The mobile training system 10 is also equipped with an electric power source and distribution system that is capable of providing electrical power to the HVAC system, lighting systems, and all other electrical systems, components and devices associated with the mobile training system 10. In one embodiment of the invention, the electric power source and distribution system includes one or more transformers to provide 110V/220V/440V electrical service. The mobile training system 10 preferably has the capability of selectively switching between a shore power source and a self-contained, on-board power source. In one embodiment of the invention, the self-contained power source comprises an electric generator 520 located on the semi-truck 12 adjacent the HVAC unit 500 (FIG. 1). In a more specific embodiment, the generator 520 is diesel-powered. It should be understood, however, that other types and configurations of on-board power sources are also contemplated as falling within the scope of the present invention. The mobile training system 10 is also preferably equipped with other types of power mechanisms and devices such as, for example, a hydraulic pump and motor, an electric motor and gear box assembly, and an air compressor.

The mobile training system 10 is also preferably equipped with a leveling system to level the enclosure 14 when in a docked or stationary position to compensate for elevation irregularities in any direction. The leveling system includes a number of landing/leveling legs 530 that may be hydraulically actuated. The storage/prep section 20 of the enclosure 14 includes a service entrance 536 that is preferably equipped with a utility lift 538 which may be either electrically or hydraulically powered. The laboratory section 22 and the conference section 24 of the enclosure 14 are each preferably provided with an entryway 540 and 542, respectively. The entryways 540, 542 are each provided with a removable/stowable stairway 544 and 546, respectively, to provide safe and convenient access to the elevated entryways 540, 542. The stairways 544, 546 preferably have removable handrails for compact storage during transport. The mobile training system 10 is also equipped with a removable awning 548 to provide covered access to the entryways 540, 542. The awning 548 is preferably supported entirely by the enclosure 14 to avoid the need for support poles or columns, and is also preferably configured to fold up to provide compact storage during transport. A number of externally-accessed storage areas or underbody compartments 550 are included below the floor level of the enclosure 14 to provide for additional storage space.

The mobile training system 10 is also equipped with an exterior lighting system 552 to illuminate the exterior of the enclosure 14 and the surrounding area. In one embodiment, the exterior lighting system 552 is comprised of a number of halogen light fixtures 554 that are removably mounted to the enclosure 14 by extension rods 556. The interior of the enclosure 14 is illuminated by an interior lighting system including either fluorescent or incandescent light fixtures. The interior of the enclosure 14 is also equipped with flooring that is both durable and easily cleanable. The extendable side portions 204a, 204b of the laboratory section 22 and the extendable side portion 304 of the conference section 24 are preferably equipped with foldable or collapsible flooring sections 558 (FIG. 3) to provide for convenient set-up/tear-down and compact storage during transport.

In one embodiment of the invention, a supply relationship may be established with an outside source to provide a continuous supply of anatomic material to the mobile training system 10 regardless of its location. Although the cooler 100 located in the storage/prep section 20 of the enclosure 14 is capable of storing a certain amount of anatomic material, in some instances the anatomic material requirements may exceed the capacity of the cooler 100. Establishing a supply relationship with an anatomic material supplier ensures a constant supply of anatomic material to satisfy the requirements of the mobile training system 10. The supply of anatomic material may be transported to the training site via a refrigerated truck or another type of refrigeration source. Moreover, it should be appreciated that, there are relatively strict rules and regulations regarding the transportation and handling of anatomic/cadaveric material, particularly when transporting such material across state lines. Since anatomic material suppliers typically have extensive knowledge and experience in transporting and handling anatomic material, establishing a supply relationship can provide significant advantages, particularly when dealing with relatively large amounts of anatomic material. Additionally, anatomic material suppliers may furnish staffing to provide mobile assistance and other services relating to the supply, handling and disposal of the anatomic material.

Referring once again to FIGS. 2 and 3, shown therein is the enclosure portion 14 of the mobile medical training system 10 in a stowed or transport configuration which allows for highway transport. When in the stowed configuration, the mobile training system 10 may be driven across highways or other roadways to various locations to function as a mobile training facility for medical personnel. When in the transport configuration, all of the equipment, devices and instrumentation associated with the mobile training system 10 is compactly and efficiently stowed within the aisle of the storage/prep section 20, the central portion 202 of the laboratory section 22, the central portion 302 of the conference section 24, and within the cabinets, bins, tubs, compartments and other storage areas of the enclosure 14. In this manner, the mobile training system 10 is virtually a self-contained unit.

Upon arrival at the training site, the landing/leveling legs 530 are extended to provide and maintain the enclosure 14 at a substantially horizontal orientation. The extendable side portions 204a, 204b of the laboratory section 22 are outwardly expanded in a lateral direction to selectively enlarge the laboratory area. Similarly, the extendable side portion 304 of the conference section 24 is outwardly expanded in a lateral direction to selectively enlarge the conference area. The foldable flooring sections 558 are then opened and laid down within the extendable side portions 204a, 204b of the laboratory section 22 and the extendable side portion 304 of the conference section 24.

Within the laboratory section 22, the x-ray machines 220, treon or ion machine 222, the microscope 224, the cabinets 226, the lockers 228, and the back tables 230 are moved to their appropriate locations. The training stations A-D are set-up with the appropriate equipment, instrumentation and devices to conduct various training activities and exercises. The examination tables 210 are pivoted from their stowed positions (FIGS. 2 and 3) to their examination positions (FIG. 1). In the conference section 24, the conference table 320 and chairs 322 are set-up and the fold-up seats 324 are opened. The appropriate audio/visual equipment and components are set-up to accommodate whatever presentation, lecture, training activity or training exercise is scheduled to occur within the conference section 24.

The mobile training system 10 may be powered by a shore power source, if available, or may be alternatively be powered by the on-board electric generator 520. The HVAC unit 500 is turned on to heat, cool, and/or ventilate the enclosure 14. The exterior lighting system 552 is set-up to illuminate the exterior of the enclosure 14 and the surrounding area. The stairways 544 and 546 are installed to provided access to the elevated entryways 540, 542, and the awning 548 is installed to cover the entryways 540, 542. If a remote communication link is required, the satellite dish 402 is removed from the satellite pool 406 and is adjusted and set to the appropriate orientation and alignment. Since the mobile training system 10 is capable of generating its own power, includes an on-board water supply, and is equipped with a satellite communication system, the mobile training system 10 is virtually a self-sufficient and self-sustaining unit.

Following completion of the training exercises and activities, the mobile medical training system 10 is transitioned back to the stowed or transport configuration illustrated in FIGS. 2 and 3. The mobile training system 10 may then be driven to a different training site to provide training to another group of medical personnel.

Referring to FIG. 10, shown therein is a side elevational view of the examination table 210. The examination table 210 generally includes a table top or support pan 600, an anchoring mechanism 602 and an adjustment mechanism 604. The table top 600 is preferably formed of a radioluscent material, such as, for example, a plastic or composite material, to allow for unimpeded radiographic or x-ray viewing of the anatomic material. The anchoring mechanism 602 releasably couples the table top 600 to the wall 214 of the enclosure 14 and is configured to permit the table top 600 to be selectively removed from the wall 214 to allow for cleaning and/or other maintenance procedures. The anchoring mechanism 602 is also configured to permit the table top 600 to be selectively pivoted between an examination or unfolded configuration (FIG. 1) and a stowed or folded configuration (FIGS. 2 and 3). The adjustment mechanism 604 supports the table top 600 and is configured to provide adjustment to the vertical position of the table top 600 between a first height $h_1$ and a second height $h_2$. The adjustment mechanism 604 is also configured to provide adjustment to the angular orientation of the table top 600 between a first angular orientation $\alpha_1$ and a second angular orientation $\alpha_2$.

Referring to FIGS. 11 and 12, shown therein is an examination table 700 according to another embodiment of the present invention. The examination table 700 generally includes a table top or support pan 702, an anchoring mechanism 704 and an adjustment mechanism 706, the details of which will be discussed below.

In one embodiment of the invention, the support pan 702 includes a bottom wall 710 and side walls 712 extending about the periphery of the bottom wall 710 to define an interior region 714 suitable for receiving anatomic material, such as, for example, a human cadaver 212 (FIG. 1). The upper end portions of the side walls 712 may be rolled or bent over to provide additional strength and rigidity to the support pan 702. In a further embodiment of the invention, the support pan 702 is formed of a radioluscent material, such as, for example, a plastic or composite material, to allow for unimpeded radiographic or x-ray viewing of the anatomic material disposed within the interior region 714 of the support pan 702. It should be understood, however, that other configurations and embodiments of the support pan 702 are also contemplated as falling within the scope of the present invention.

In one embodiment of the invention, the anchoring mechanism 704 is configured to releasably couple the support pan 702 to the wall 214 of the enclosure 14, thereby permitting the support pan 702 to be selectively removed from the wall 214 to allow for storage, cleaning and/or other maintenance procedures, the details of which will be discussed below. In a further embodiment of the invention, the anchoring mechanism 704 is configured to permit the support pan 702 to be selectively pivoted between a first angular orientation $\alpha_1$, and a second angular orientation $\alpha_2$, and to permit the support pan 702 to be selectively positioned between a first height $h_1$ and a second height $h_2$, the details of which will also be discussed below.

In a specific embodiment of the invention, the anchoring mechanism 704 includes an mounting portion 720 that is pivotally coupled to a base portion 722 via a hinge 724 so as to allow the mounting portion 720 (and the support pan 702) to pivot relative to the base portion 722 about a pivot axis P. The base portion 722 also cooperates with a track or guide 726 secured to the wall 214 of the enclosure 14 so as to allow the anchoring mechanism 704 (and the support pan 702) to be displaced generally along a vertical axis V. The mounting portion 720 includes a bottom wall 730 and side walls 732 that define an inner area sized to receive an end portion of the support pan 702 therein. The mounting portion 720 also includes a retention flange 734 (FIG. 12) that extends into the interior region 714 of the support pan 702 to retain the support pan 702 in selective engagement with the mounting portion 720. As should be appreciated, the support pan 702 may be disengaged from the mounting portion 720 by pivoting the far end of the support pan 702 in an upward direction relative to the mounting portion 720 such that the upper lip of the pan side wall 712 adjacent the near end of the support pan 702 is displaced beyond the end of the retention flange 734. Selective disengagement and removal of the support pan 702 from the mounting portion 720 is particularly advantageous for transport and storage purposes as well as to accommodate cleaning and/or other maintenance procedures.

In one embodiment of the invention, the adjustment mechanism 706 is configured to adjust the angular orientation of the support pan 702 between the first and second angular orientations $\alpha_1$, $\alpha_2$ and to adjust the vertical position of the support pan 702 between the first and second heights $h_1$, $h_2$. In a further embodiment of the invention, the adjustment mechanism 706 includes a pedestal support member 750 and a pair of actuating members 752a, 752b that provide the requisite forces to adjust the angular orientation and vertical position of the support pan 702. In a specific embodiment, the actuating members 752a, 752b are pneumatic cylinders that are actuated by a pressurized air source and a number of control valves, the details of which would be apparent to one of skill in the art. However, it should be understood that other types and configurations of actuating members are also contemplated, including, for example, hydraulic cylinders, screw actuators, linear drives, or other types and configurations of actuators that would occur to one of skill in the art.

The pneumatic cylinder 752a is pivotally coupled between the pedestal support 750 and the mounting portion 720 of the anchoring mechanism 704. As should be appreciated, retraction of the pneumatic cylinder 752a correspondingly pivots the support pan 702 in a downward direction from the first angular orientation $\alpha_1$, (shown in solid) toward the second angular orientation $\alpha_2$ (shown in phantom). Similarly, extension of the pneumatic cylinder 752a correspondingly pivots the support pan 702 in an upward direction from the second angular orientation $\alpha_2$ toward the first angular orientation $\alpha_1$. In a specific embodiment of the invention, the first angular orientation $\alpha_1$ of the support pan 702 is approximately 90 degrees (i.e., a substantially horizontal orientation) and the second angular orientation $\alpha_2$ of the support pan 702 is approximately 105 degrees, thereby providing an overall angular adjustment of about 15 degrees. However, it should be understood that these angular orientations are exemplary and that other angular orientations of the support pan 702 are also contemplated. It should also be appreciated that following removal of the support pan 702 from the mounting portion 720, the pneumatic cylinder 752a may be fully extended to arrange the mounting portion 720 in a substantially vertical orientation, thereby reducing the footprint area of the mounting portion 720 during transport of the mobile training system 10.

The pneumatic cylinder 752b is coupled between the pedestal support 750 and the mounting portion 720 of the anchoring mechanism 704. As should be appreciated, retraction of the pneumatic cylinder 752b correspondingly displaces the support pan 702 in a downward direction from the first height $h_1$, (shown in solid) toward the second height $h_2$ (shown in phantom). Similarly, extension of the pneumatic cylinder 752b correspondingly displaces the support pan 702 in an upward direction from the second height $h_2$ toward the first height $h_1$. In one embodiment, the difference in elevation between the first and second heights $h_1$, $h_2$ is about 12 inches. However, it should be understood that this elevational change is exemplary and that other elevational changes of the support pan 702 are also contemplated.

In the above-discussed embodiment of the invention, non-living anatomic material is provided for conducting one or more training activities to train medical personnel. However, it should be understood that in other embodiments of the invention, an anatomic representation may be used to train medical personnel in association with the mobile training system 10. Such anatomic representations may include various types of training models or simulators, the details of which will be discussed below.

In one embodiment of the invention, a three-dimensional training model may be provided to replicate a portion of the anatomy, such as, for example, the spinal column. However, it should be understood that training models may be provided that replicate other portions of the anatomy, including but not limited to other bony structures, neuro-structures, vascular structures and/or tissue. In a specific embodiment, a "sawbones" type model may be used to provide training to medical personnel. Such models may be formed from materials including but not limited to wood-based materials, plastic or polymeric materials, composite materials, or other types of materials that would occur to one of skill in the art.

In another embodiment of the invention, an electronic simulator may be used to train medical personnel in association with the mobile training system 10. In a specific embodiment, a virtual simulator is used to provide visualization of a virtual anatomic structure that simulates an actual anatomic structure. The virtual simulator may be controlled via on-board equipment and/or by remote equipment in communication with the mobile training system 10 via an electronic communication system. The electronic communication system may include, for example, the satellite communication system 400, a telecommunications system, or any other type of communication system known to those of skill in the art. Visualization of the virtual anatomic structure may be accomplished by way of headgear such as goggles or glasses, a monitor or display, a holographic image, or any other type of visualization means that would occur to one of skill in the art. Various types of medical equipment, instrumentation, devices and implants may also be used to provide simulated hands-on training to the medical personnel. The virtual simulator may be configured to provide real-time feedback as to the position and orientation of the medical equipment, instrumentation, devices and implants relative to the virtual anatomic structure.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A mobile medical training system, comprising:
    an enclosure adapted for transport to a training site, said enclosure including a laboratory section equipped with medical equipment and instrumentation;
    a supply of non-living anatomic material for conducting one or more training activities in said laboratory section to provide training to medical personnel; and
    an examination table disposed within said laboratory section for supporting an amount of said non-living anatomic material, wherein said examination table is coupled to said enclosure so that said examination table can be moved between a stowed position and an examination position, and wherein said stowed position is ranged in a substantially vertical orientation and wherein said examination position is arranged in a substantially horizontal orientation.

2. The system of claim 1, wherein said examination table is pivotally coupled to said enclosure to provide pivotal movement between said stowed position and said examination position.

3. The system of claim 1, wherein said non-living anatomic material comprises cadaveric material.

4. The mobile medical training system of claim 3, wherein said cadaveric material comprises at least a portion of the spinal column.

5. The mobile medical training system. of claim 1, further comprising a refrigeration source for storing an amount of said non-living anatomic material.

6. The mobile medical training system of claim 1, wherein said enclosure further includes a preparation section for use in preparing material and devices for use in said laboratory section.

7. The mobile medical training system of claim 6, wherein said preparation section is equipped with an ultrasonic washer for cleaning instruments and devices for use in said laboratory section.

8. The mobile medical training system of claim 1, wherein said enclosure further includes a conference section sized to accommodate a group of medical personnel, said conference section being equipped with audio/visual equipment to facilitate training of the group of medical personnel.

9. The mobile medical training system of claim 8, wherein said laboratory section and said conference section are linked by an electronic communication system.

10. The mobile medical training system of claim 1, wherein said enclosure includes at least one laterally expandable portion for selective enlargement of said laboratory section.

11. The mobile medical training system of claim 1, wherein said laboratory section includes multiple training stations.

12. The mobile medical training system of claim 1, further comprising an anchoring mechanism adapted to releasably connect said examination table to said enclosure.

13. The mobile medical training system of claim 1, wherein said examination table includes an adjustment mechanism adapted to selectively adjust a vertical position of said examination table.

14. The mobile medical training system of claim 1, wherein said examination table includes an adjustment mechanism adapted to selectively adjust an angular orientation of said examination table.

15. The mobile medical training system of claim 1, wherein said examination table is radiolucent.

16. The mobile medical training system of claim 1, further comprising an electronic communication system adapted to provide visual communication between said training site and a remote site.

17. The mobile medical training system of claim 16, wherein said electronic communication system is a satellite communication system.

18. The mobile medical training system of claim 16, wherein said remote site is a live operating room.

19. The mobile medical training system of claim 1, further comprising at least one additional examination table within said laboratory section.

20. The mobile medical training system claim 19, wherein said laboratory section has a wall, and at least one of said examination tables are coupled to said wall.

21. The mobile medical training system of claim 1, wherein said examination table is releasably coupled to said enclosure.

22. The mobile medical training system of claim 1, wherein said examination table is adjustable in at least one of vertical position and angular orientation.

23. The mobile medical training system of claim 1, wherein said examination table includes a support pan having a bottom wall and one or more side walls extending about the periphery of said bottom wall to define an interior region adapted for receiving anatomic material.

24. The mobile medical training system of claim 23, further comprising an actuating member for adjusting at least one of angular orientation and vertical position of said support pan.

25. The mobile medical training system of claim 24, wherein said actuating member is a pneumatic cylinder.

26. The mobile medical training system of claim 1, wherein said examination table forms part of a training station, and said training station further being equipped with a video camera mounted above said examination table.

27. The mobile medical training system of claim 26, further comprising a viewing monitor, and said video camera is electronically coupled to said monitor.

28. The mobile medical training system of claim 27, wherein said monitor is in said laboratory section.

29. The mobile medical training system of claim 27, wherein said enclosure includes a conference section, and said monitor is in said conference section.

30. The mobile medical training system of claim 8, wherein said conference section includes a main conference room area and a lavatory area.

31. The mobile medical training system of claim 8, wherein said conference section includes a control desk having storage and adapted for accommodation of conference room equipment.

* * * * *